INVENTOR.
HEINZ HUMMEL

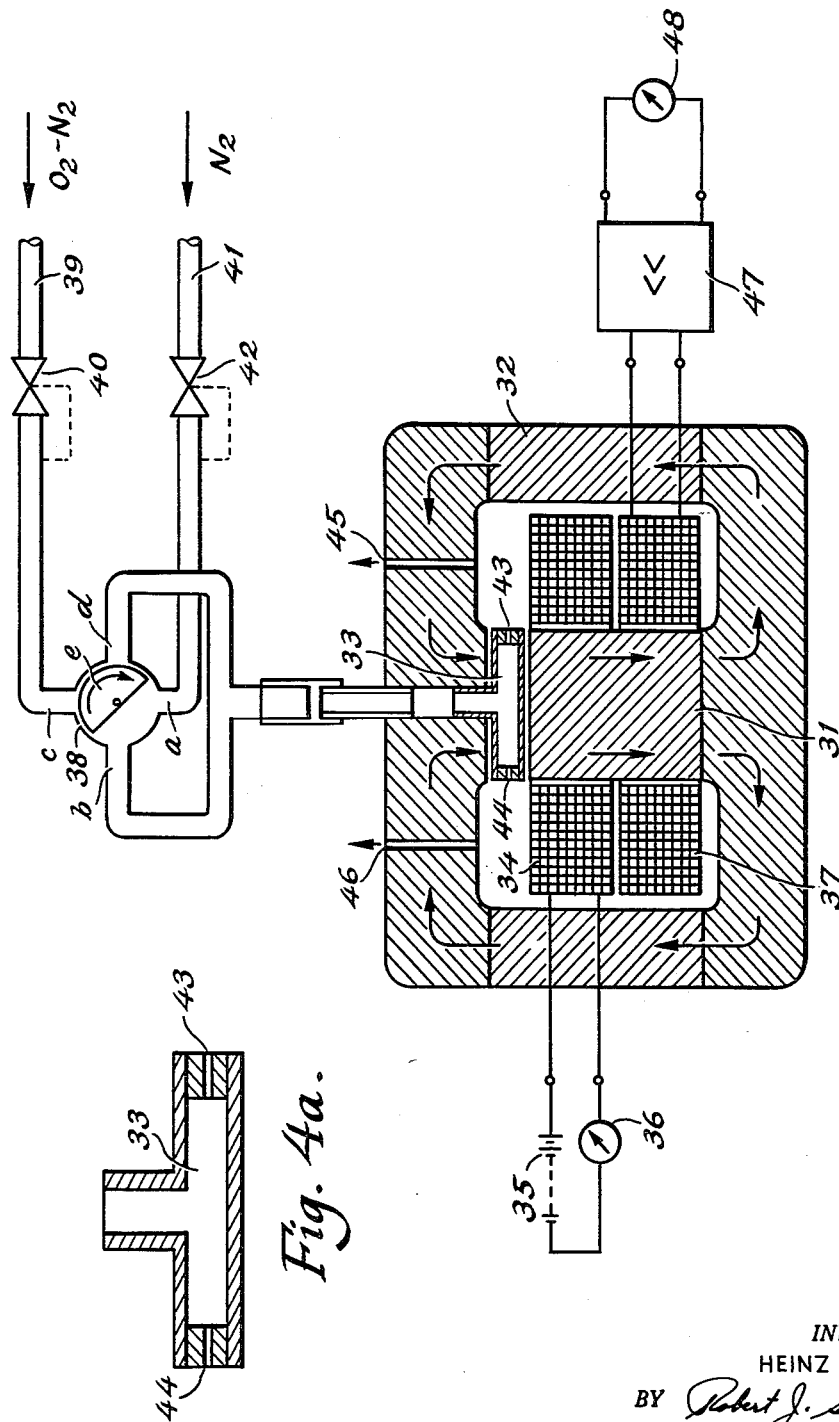

United States Patent Office 3,049,665
Patented Aug. 14, 1962

3,049,665
MEASURING INSTRUMENT AND METHOD
Heinz Hummel, Johannesallee 22 W., Frankfurt-Unterliederbach, Germany
Filed July 10, 1958, Ser. No. 747,638
9 Claims. (Cl. 324—36)

This invention relates generally to the measurement of substances exhibiting magnetic properties and, in particular, to methods and apparatus for measuring paramagnetic gases and liquids. As used herein, "gases" is to be construed in its broadest sense and includes any aeriform fluid or fluid in compressible state. Various techniques have previously been used for the analysis of mixtures by magnetic means. These methods have been particularly useful in the measurement and recording of oxygen in gas mixtures, wherein use is made of the fact that oxygen has a high paramagnetic susceptibility, whereas almost all other gases of common analytical interest possess a relatively small diamagnetic susceptibility. Exceptions which may be cited are nitrogen oxide and dioxide, which are also paramagnetic, but which are only infrequently found in association with oxygen.

Many of the previously known paramagnetic oxygen analyzers have been based upon what may be termed the thermomagnetic principle (Lehrer und Ebbinghaus, Zeitschr. für angewandte Physik, 1950; Naumann, ATM, 1952; Krupp, Zeitschr. für angewandte Physik, 1954). In these devices a heated wire or array of wires is mounted in a non-homogeneous magnetic field and exposed to a gas sample. Convection currents are thereby produced which, in the presence of a paramagnetic gas such as oxygen, are enhanced in greater or less degree depending on the amount of such gas present. These convection currents, by affecting the rate of cooling of the wires, produce a change in their resistance and provide thereby a measure of the oxygen content of the sample.

In another method (Vuorelainen, Osterreichische Chem. Zeitung, 1950) a torque is produced upon a "dumb-bell" comprising two spheres of a diamagnetic material mounted within non-homogeneous field regions of a permanent magnet, the torque being a measure of oxygen content in the space surrounding the spheres. This type of system is mechanically relatively delicate, and is sensitive to the position of mounting or orientation of the instrument and to vibration.

A further method developed by Luft (Luft, Zeitschr. für angewandte Physik, 1951), which is in a sense a variation of the thermomagnetic methods, relies upon the measurement of a pressure effect produced in a sample gas by exposing it to the field of a rotating pole piece. The pressure variations, dependent upon oxygen content, are measured by a membrane condenser and associated circuit in well known fashion.

The thermomagnetic methods have in practice suffered from certain disadvantages. Their zero stability as well as their sensitivity is strongly dependent on gases other than oxygen which may comprise the sample mixture. Where such gas mixtures vary greatly in composition, these effects are highly objectionable and in many cases, for example where a widely varying hydrogen content is encountered, measurement is virtually impossible. These difficulties are sometimes reduced to a tolerable level by appropriate corrective measures; however, such solutions are effective in special cases only, and are not generally applicable. It is possible, for example, in an apparatus of this type, to make the zero level for carbon dioxide and nitrogen independent of variations in the diluting or carrier gas; but then the independence does not apply to hydrogen, ethane, and other gases. Further, the method provides no direct means by which the sensitivity may be corrected upon change of the carrier gas. To the extent also that viscosity, density, and specific heat of the carrier gas affect the measurement, the thermomagnetic analyzer cannot in a true sense be described as a selectively sensitive analytical instrument.

Another disadvantage of the thermomagnetic principle is the dependence of the indication on the temperature and barometric pressure. Whereas the pure paramagnetic effect, in terms of partial pressure of oxygen, is related in clear fashion to the temperature, being in fact proportional to the reciprocal of the absolute temperature, this dependence in various thermomagnetic analyzers often becomes quite complicated. Further, the temperature dependence in general in thermomagnetic devices varies according to the nature of the carrier gas. In some of these devices the difficulties have been minimized by electrical correcting circuits. In some, each individual instrument must be adjusted in a procedure which may require several days. In others, the errors are minimized by enclosing the apparatus in a thermostatically controlled chamber. In any case, these measures are merely ameliorative; they do not in general eliminate the temperature and pressure errors which are encountered. A further disadvantage of the thermomagnetic devices is the expense added to their manufacture by the adjustment and calibration required. This is a consequence of the fact that the temperature distributions associated with the hot wires must always have the same relationship to the magnetic field. Finally, the thermomagnetic and other paramagnetic systems of the prior art have been characterized by relatively slow response to changes in sample composition.

It is a principal object of the present invention to offer an improved, practical method and apparatus for the measurement of paramagnetic substances and mixtures that avoid the aforementioned difficulties. The method and apparatus of the invention may be used either to determine the proportion of a paramagnetic component such as oxygen in a mixture, or to determine the absolute magnetic suceptibility of substances. The method of the invention may be used advantageously for the examination of gases, including vapors, as well as liquids. The apparatus of the invention is position- and vibration-insensitive and rapid in response.

In one form of the invention, a cyclically varying magnetic flux is produced by periodically varying the presence or condition of a sample material within a gap in a magnetic circuit. For example, the sample may be intermittently inserted and removed from the gap, or its pressure may be cyclically varied if it is in gaseous state. In this method, the reluctance of the gap is in effect cyclically modulated. The magnetomotive force producing the flux in the circuit may, if desired, be provided by a permanent magnet coupled into the magnetic circuit. Alternatively, it may be provided by D.C. coil means coupled to the magnetic circuit, which in this case may comprise a soft iron core. Also, the magnetic circuit may be energized by high frequency means, and the high frequency flux may be modulated by relatively low frequency changes in or of the sample.

For pressure modulation of gases, the pressure variation may be produced by the periodic motion of a piston, or a periodically driven membrane may be employed. Alternatively, the gas stream connected to the sample chamber in the gap may be intermittently turned on and off to produce the cyclical pressure variation, or a rotating vane device such as a rotating vane pump well known to those skilled in the art may be employed.

In another useful variation of the invention, the flux may be modulated by cyclically and alternatingly filling the gap with the substance to be measured and with a comparison or reference substance.

In another form of the invention the magnetic flux is cyclically modulated by alternating current means, for example, by means of an A.C. coil coupled to the magnetic circuit.

Regardless of the method of flux modulation used, the magnetic properties of the sample affect the amplitude of cyclical flux modulation in the magnetic circuit, providing thereby a measure of the sample property or concentration. Thus, an increase in oxygen concentration in the gap, by decreasing the reluctance of the gap, will increase the amplitude of the cyclical flux variation. Suitable means are employed, for example a sensing coil coupled to the circuit, for providing an output signal as a function of the flux variation to obtain a measure of the sample which may be recorded and calibrated, e.g. in terms of percent of the magnetic component.

In a further form of the invention two magnetic circuits are employed, serving respectively as reference and sample responsive circuits, and these may be coupled together, for example by means of a magnetic branch common to both circuits. Both circuits may be excited by the same low frequency or high frequency energy, and at least one, but preferably both, circuits are provided with gaps. The substance to be measured is introduced into the gap of one of the circuits, and a comparison or reference substance may be introduced into the gap of the other circuit. Preferably, the apparatus is so devised that the magnetic circuits are substantially similar and are symmetrical in construction. Means are further provided for inducing magnetic flux in both circuits, for cyclically modulating the flux of both circuits, and for sensing by suitable differential means the difference between the amplitudes of flux modulation in the respective circuits as a measure of the sample relative to the reference substance.

In the accompanying drawings,

FIG. 4 represents another embodiment of the invention showing an alternative method of sample modulation; and FIG. 4a is an enlarged view of the sample chamber portion of the FIG. 4 embodiment.

Figure 1:
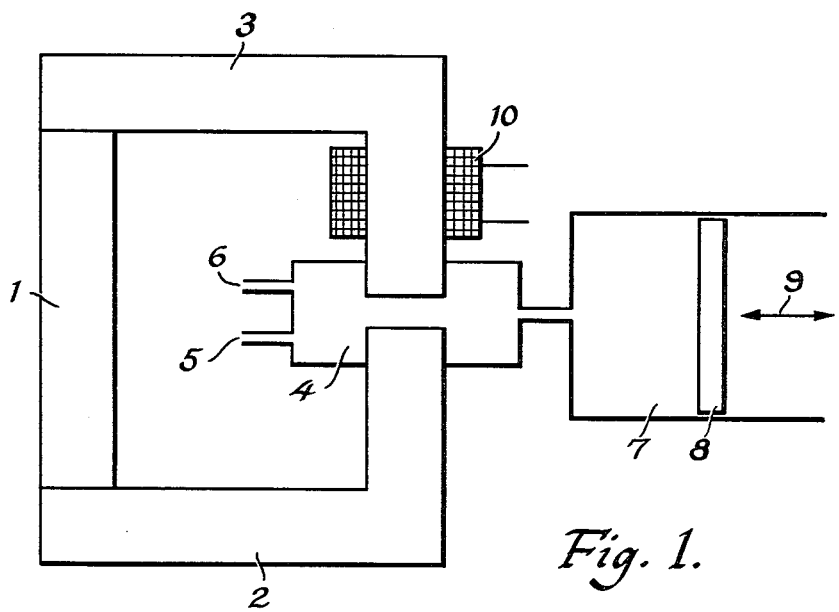
FIG. 1 illustrates schematically one of the embodiments of the invention.

Referring particularly now to FIG. 1, there is shown an apparatus of the invention in which the sample gas is introduced into a gap in series with a magnetic circuit, and the magnetic reluctance of the gap is cyclically varied by varying the pressure of the gas. The magnetic flux is induced by a permanent magnet 1 embodied in the ferromagnetic portion of the circuit, the flux being directed through soft iron pole pieces 2 and 3 to a sample chamber 4 bridging the gap portion of the circuit between the ends of the pole pieces, as illustrated. The sample gas, which may for example be a mixture of nitrogen and oxygen, is continuously introduced into the sample chamber through input constriction 5 and vented through output constriction 6. The sample chamber communicates by way of a conduit with a cylinder 7 fitted with a piston 8. The latter is cyclically driven back and forth at a constant frequency by any conventional driving means (not shown) and produces a cyclically varying pressure in chamber 4. As an alternative to the piston and cylinder arrangement and oscillating membrane system of well-known type may be used. In either case, as a result of the pressure variation, the magnetic circuit flux is cyclically modulated, the amplitude of the flux modulation being a measure of the paramagnetic susceptibility of the sample chamber contents. The cyclically varying magnetic flux induces in coil 10 an alternating voltage which, after amplification and rectification, may be applied to an indicating means such as an electrical recorder (not shown). The recorder may be calibrated in terms of percent oxygen in the gas to be measured. The apparatus of FIG. 1, employing a single magnetic circuit, has the particular advantage of high zero stability. This zero stability in influenced neither by temperature effects, nor variations in line voltage, nor by changes occurring in the materials of construction of the instrument; in fact, the apparatus requires no zero adjustment because it possesses an absolute zero. A further advantage is that the apparatus is mechanically simple and therefore easily manufactured.

Figure 2:
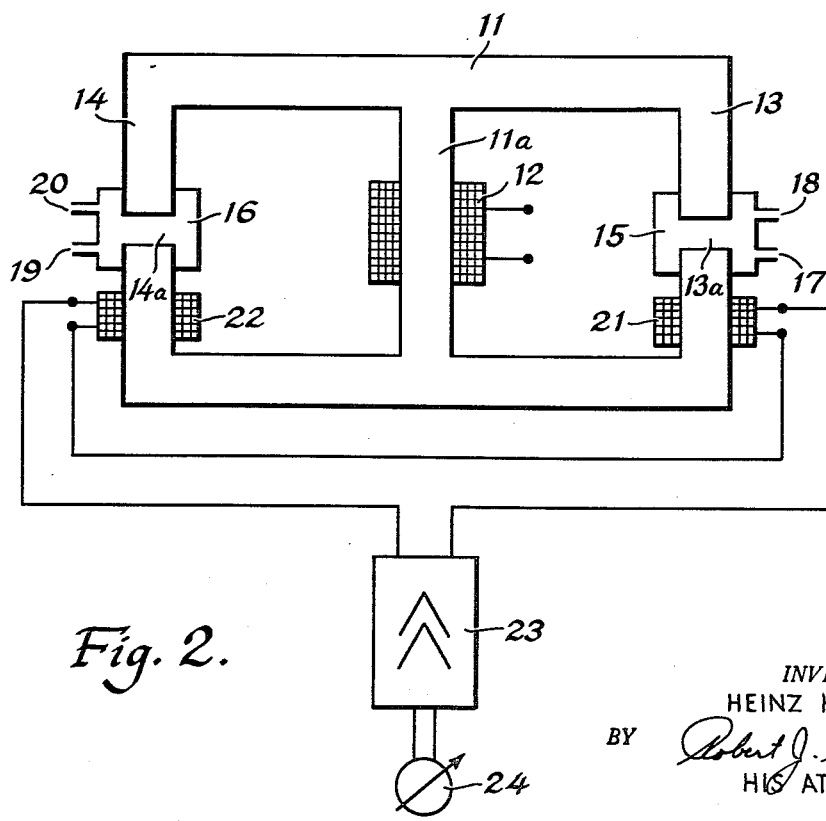
FIG. 2 illustrates schematically another embodiment of the invention employing a dual magnetic circuit arrangement.

FIG. 2 shows an apparatus employing two mutually coupled magnetic circuits. The ferromagnetic portion of the dual magnetic circuit comprises a soft iron body 11 having a common branch or member 11a. Mounted upon member 11a is a coil 12 energized by a constant alternating voltage. The flux generated by the coil is branched or divided substantially equally into the two magnetic circuits and substantially equally permeates the pole pieces 13 and 14 and the associated gap portions 13a and 14a of the circuits. These gaps are respectively bridged by a sample chamber 15 and a reference chamber 16. The pole pieces 13 and 14 are also respectively provided with sensing coils 21 and 22, which are connected in series opposition to the input of an amplifier 23 whereby the amplifier responds to the difference between the respectively induced voltages. Sample chamber 15 and reference chamber 16 are provided respectively with inlets 17 and 19, and with outlets 18 and 20. If the same material is supplied to cells 15 and 16, for example nitrogen, the voltages induced in coils 21 and 22 are equal and effectively zero potential is applied to the amplifier input. Any remaining asymmetry in the arrangement may be compensated for by mechanical means, such as shims or shunts, or by electrical correcting means (not shown). In use, the reference chamber 16 is filled or continuously supplied with a substance of constant composition, the sample chamber 15 being supplied with the gas to be measured, for example an oxygen-nitrogen mixture. In general, the flux traversing both magnetic circuits is thereby made unequal, and a net voltage which is a measure of the flux difference is produced by the sensing coils. This difference voltage signal is, of course, a measure of the difference between the magnetic susceptibilities of the substances in chambers 15 and 16, hence a measure of the paramagnetic component of the sample relative to that of the reference. The difference signal may after amplification and rectification be applied to a recorder 24 which may, for example, be calibrated in terms of percent oxygen in the sample.

Figure 3:
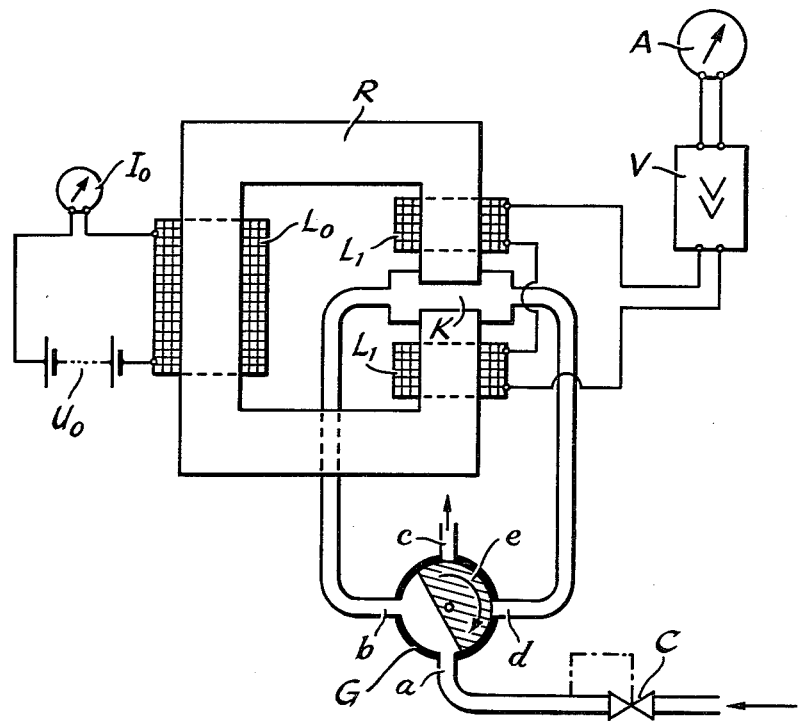
FIG. 3 illustrates schematically an embodiment related to that of FIG. 1.

FIG. 3 shows an embodiment generally similar to FIG. 1. Here the source of magnetomotive force producing flux in the magnetic circuit is a coil $L_0$ mounted on a ferromagnetic member R. Coil $L_0$ is energized by a D.C. source exemplified as a battery $U_0$ and draws a current which is indicated on a meter $I_0$. Bridging the gap portion of the magnetic circuit is the sample chamber K. A sample gas is conveyed to the chamber through a pressure regulator C and a rotating valve member comprising a shell G, a rotating valve body $e$ and ports $a$, $b$, $c$, and $d$. The sample gas after pressure regulation at regulator C enters the valve at inlet port $a$. It may be seen that during one-half of each revolution of valve body $e$ the inlet port $a$ is connected to the sample chamber through one or the other of the ports $b$ and $d$.

During the remaining half-revolution port $a$ is closed by the valve body and one or the other of ports $b$ and $d$ is connected to port $c$, the latter being a venting port through which the pressurized gas in the sample chamber may be vented to the atmosphere or into an exhaust conduit. It may be desirable by suitable design of the valve body $e$ to cause the two valving periods to overlap each other slightly. For example, the straight edge in FIG. 3 shown as bounding one edge of body $e$ may be shifted closer to the center of rotation. The valve, driven at constant speed by means not shown, accordingly acts to modulate the pressure cyclically in the sample chamber. A suitable speed may, for example, be six cycles per second. Sensing coil $L_1$, conveniently split into two separate sections which are coupled to the ferromagnetic member R adjacent the magnetic circuit gap and connected in electrical series aiding, is connected to a measuring instrument A through an amplifier V. The sensing coil $L_1$, of course, functions in a manner similar to sensing coil 10 of FIG. 1 to provide a signal voltage which is a measure of the magnetic property of the sample gas.

In an alternative pressure modulating arrangement (not shown), the sample gas may be directed through a suitable flow restrictor to the sample chamber, and the outlet tube of the sample chamber may be connected to a nozzle through a second flow restrictor. The nozzle may be positioned closely against a rotating disk in which openings are provided in such manner that the jet is alternately opened and closed during approximately equal intervals. The frequency of the pressure variation is then determined by the disk rotation frequency and the number of openings.

As an example of an application of the invention, an apparatus constructed according to FIG. 3 was used for the measurement of oxygen in nitrogen (range 0–3 volume percent). The gas sample was introduced to the rotating valve at a constantly maintained pressure of 500 mm. of water column. The height of the sample chamber, i.e., the height of the gap, was approximately 0.1 mm. This type of application, exemplifying analysis of two-component mixtures, is especially well handled by high zero stability, single magnetic circuit embodiments such as illustrated in FIGS. 1 and 3.

The apparatus of FIGS. 1 and 3 may also be used successfully to monitor a nitrogen-hydrogen mixture of varying composition for its oxygen content (range 0–10 volume percent). The apparatus in this case has the particular advantage that not only the zero stability but also the sensitivity is practically independent of the nitrogen-hydrogen ratio. As discussed above, this is not true of prior art apparatus based on the thermomagnetic principle. The measurement of oxygen in the presence of a nitrogen-hydrogen mixture is of considerable practical importance in the monitoring of gases given off in combustion processes.

Another problem frequently encountered is the measurement of purity of oxygen (95–100 percent). For such application the apparatus shown in FIG. 2 may be employed. The reference chamber 16 is in this case supplied with pure oxygen from a calibrating oxygen tank, and sample chamber 15 is fed with the gas to be measured. Measurements of this kind, involving a large suppression of the zero level, can be carried out by the thermomagnetic methods only with the greatest difficulty.

FIGS. 4 and 4a show another embodiment employing a single magnetic circuit. The circuit comprises a ferromagnetic assembly or core of the pot type including a central portion 31 and an enclosing peripheral portion 32. A sample chamber 33 is positioned in a gap in the magnetic circuit adjoining one end of the central core portion as shown. Coil 34 mounted on the central core is energized by a D.C. source such as battery 35 and induces a flux in the magnetic circuit in paths indicated by the arrows. The coil current is indicated on meter 36. Coil 37, also mounted on the central core portion, is a sensing coil responsive to variations of flux in the magnetic circuit.

A gas flow switching means is employed, exemplified as a valve assembly 38 similar to that shown in FIG. 3 with identical reference characters, which cyclically and alternatingly introduces sample gas and comparison or reference gas into the sample chamber 33. The sample gas, which may for example be an oxygen-nitrogen mixture, enters conduit 39 and passes through a pressure regulator means 40 to port $c$. The reference gas, which may be nitrogen, enters conduit 41 and passes through a pressure regulator means 42 to port $a$. Valve member $e$ is driven by means, not shown, at a constant speed. The effect of the valve action is to introduce sample gas into the chamber 33 during one-half of each cycle of valve rotation, and to introduce the reference gas during the remaining half cycle. Chamber 33 is vented to the atmosphere by way of outlet constrictions 43 and 44 and ports 45 and 46 in the magnetic core. Assuming the sample and reference gases are the same, for example both pure nitrogen, there is no resulting modulation of the reluctance of the gap, and no signal is induced in coil 37. To the extent however that the sample contains oxygen, i.e. a gas with a magnetic property, the gap reluctance is cyclically modulated at the valve rotation frequency, and a signal is induced in sensing coil 37. This signal is applied as shown to an amplifier 47 and to a recorder 48 calibrated in terms of percent of oxygen.

While my invention has been described by reference to particular embodiments thereof, alternative constructions will readily occur to those skilled in the art. I, therefore, aim in the appended claims to cover all such equivalent embodiments as may be within the true spirit and scope of the foregoing description.

What I claim as new and desire to secure by Letters Patent of the United States is:

1. In an apparatus for measuring a substance exhibiting a magnetic property, the combination of: means defining a magnetic circuit having a gap therein; means providing a magnetomotive force in said circuit for generating flux therein; means for periodically varying the magnetic reluctance of said gap and the amplitude of flux traversing said magnetic circuit comprising means for inserting periodically varying permeances of the substance to be measured into said gap; and sensing means responsive to the amplitude of said flux variation.

2. In an apparatus for measuring a gaseous component exhibiting a magnetic property, the combination of: means defining a magnetic circuit; means defining a gap in said circuit; means inducing a magnetic flux in said circuit; means for cyclically modulating said magnetic flux comprising means for introducing said substance into said gap and for modulating the pressure thereof in said gap; and sensing means responsive to the amplitude of modulation of said flux.

3. In an apparatus for measuring a sample substance exhibiting a magnetic property, the combination of: means defining first and second magnetic circuits, means defining first and second gaps respectively in each of said circuits; a sample chamber disposed in each of said gaps; means generating magnetomotive forces respectively in said first and second circuits for generating flux therein; means for introducing the sample substance into the sample chamber disposed in said first gap of said first circuit for varying the magnetic reluctance thereof; means for introducing a comparison substance into the sample chamber disposed in said second gap of said second circuit; means for cyclically modulating the magnetic flux of said first and second magnetic circuits; and sensing coil means coupled to said first and second circuits, said coil means being responsive to a difference between the amplitudes of flux modulation in said respective circuits, whereby the magnitude of response of said coil is a measure of said sample substance relative to said comparison substance.

4. In an apparatus for analyzing a gas sample exhibiting a magnetic property, the combination of: magnetic circuit means including in series a ferromagnetic portion and a gap portion; means inducing a magnetic flux in said circuit; means defining a chamber for containing the sample; inlet and outlet means respectively admitting said sample into said chamber and releasing said sample therefrom; cyclically driven piston means communicating with said chamber for cyclically varying the pressure of said sample in said chamber and cyclically modulating thereby the reluctance of said gap and the magnitude of said flux; and coil means coupled to said magnetic circuit means, said coil means being responsive to the amplitude of said flux modulation and generating an output signal as a measure of said sample.

5. In an apparatus for analyzing a gas sample exhibiting a magnetic property, the combination of: magnetic circuit means including in series a ferromagnetic portion and a gap portion; means inducing a magnetic flux in said circuit; means defining a sample chamber contained within said gap; cyclically operable valve means for admitting the sample to said chamber from a source of relatively high pressure during a portion of each valve operating cycle, said valve means acting during another portion of each cycle to vent said chamber to a space at relatively lower pressure whereby the magnetic reluctance of said gap is cyclically modulated; and coil means mounted on said ferromagnetic portion, said coil means being responsive to variations of said flux and generating an output signal as a measure of said sample.

6. In an apparatus for analyzing a gas sample exhibiting a magnetic property, the combination of: magnetic circuit means including in series a ferromagnetic portion and a gap portion; means inducing a magnetic flux in said circuit; means defining a sample chamber contained within said gap; cyclically operable valve means for flowing the sample through said chamber during a first portion of each valve operating cycle; means supplying a comparison gas, said valve means being operable to flow said comparison gas through said sample chamber during a second portion of each valve operating cycle whereby said flux is cyclically modulated as a function of a difference in composition between said comparison and said sample gases; and sensing coil means coupled to said magnetic circuit means, said coil means being responsive to the amplitude of said flux modulation and generating cyclically varying output signal as a measure of said composition difference.

7. In an apparatus for analyzing a gas sample exhibiting a magnetic property, the combination of: magnetic circuit means including in series a ferromagnetic portion and a gap portion; means inducing a magnetic flux in said circuit; sample chamber means contained within said gap portion; first conduit means including a first pressure regulator supplying the sample to be analyzed; second conduit means including a second pressure regulator supplying a comparison gas; cyclically operable valve means for flowing said sample from said first conduit means into said chamber during a first portion of each valve operating cycle and for flowing said comparison gas from said second conduit into said chamber during a second portion of each valve operating cycle whereby said flux is cyclically modulated as a function of a difference in composition between said comparison and said sample gases; flow restrictor means coupled to said sample chamber for restricting the outflow of said sample and said comparison gases from said sample chamber; and sensing coil means coupled to said magnetic circuit means, said coil means being responsive to the amplitude of modulation of said flux and generating a cyclically varying output signal as a measure of said composition difference.

8. A method for measuring a gaseous substance exhibiting a magnetic property comprising: generating a flux in a magnetic circuit; inserting the sample in the path of said flux; cyclically modulating said flux by modulating the pressure of said sample in said flux path; and measuring the amplitude of modulation of said flux as a function of the amount of said substance in said flux path.

9. Measurement apparatus comprising: a magnetic circuit having a gap therein, across which magnetic flux exists; a sample chamber disposed in said gap; means for passing a substance having a magnetic property through said chamber; modulation means for periodically varying the pressure within said chamber to periodically modulate said magnetic flux, whereby the amplitude of the modulated flux is related to the quantity of said substance having a magnetic property within the chamber; and output means responsive to the amplitude of the modulated flux to indicate the measure of said substance having a magnetic property within the chamber.

References Cited in the file of this patent
UNITED STATES PATENTS

| | | |
|---|---|---|
| 2,467,211 | Hornfeck | Apr. 12, 1949 |
| 2,625,588 | Peters | Jan. 13, 1953 |
| 2,689,332 | Greene | Sept. 14, 1954 |
| 2,755,433 | Lease et al. | July 17, 1956 |
| 2,930,970 | Vollmer | Mar. 29, 1960 |